US010274861B2

(12) United States Patent
Hirata

(10) Patent No.: US 10,274,861 B2
(45) Date of Patent: Apr. 30, 2019

(54) IMAGE FORMING APPARATUS AND METHOD OF CONTROLLING IMAGE FORMING APPARATUS INCLUDING EXPOSURE LIGHTING AND MIRROR ROTATION CONTROL

(71) Applicant: BROTHER KOGYO KABUSHIKI KAISHA, Nagoya-shi, Aichi-ken (JP)

(72) Inventor: Hironori Hirata, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/800,699

(22) Filed: Nov. 1, 2017

(65) Prior Publication Data

US 2018/0120729 A1    May 3, 2018

(30) Foreign Application Priority Data

Nov. 3, 2016 (JP) ................................. 2016-215736

(51) Int. Cl.
*H04N 1/113* (2006.01)
*G03G 15/04* (2006.01)
(Continued)

(52) U.S. Cl.
CPC ....... *G03G 15/043* (2013.01); *G03G 15/0409* (2013.01); *H02P 6/08* (2013.01);
(Continued)

(58) Field of Classification Search
CPC ...... G06F 3/121; G06K 15/16; G06K 15/043; G06K 15/01036; H04N 1/113; H04N 1/295; B41J 11/006; B41J 29/48
See application file for complete search history.

(56) References Cited

U.S. PATENT DOCUMENTS 8,581,951 B2 * 11/2013 Fujishiro .............. G03G 15/043
347/229
2010/0245521 A1   9/2010 Kubo
(Continued)

FOREIGN PATENT DOCUMENTS

JP    2010-237622 A    10/2010
JP    2012-011632 A    1/2012
(Continued)

*Primary Examiner* — Walter L Lindsay, Jr.
*Assistant Examiner* — Arlene Heredia
(74) *Attorney, Agent, or Firm* — Merchant & Gould P.C.

(57) ABSTRACT

An image forming apparatus includes a controller, wherein the controller execute first control of controlling a rotational frequency of the motor based on a light receiving signal, wherein, when the target rotational frequency changes from a first rotational frequency to a second rotational frequency that is lower than the first rotational frequency, the controller executes speed change control of: stopping execution of the first control; and changing a rotational frequency of the motor, and non-lighting period change control of changing the non-lighting period in the lighting control from a first non-lighting period corresponding to the first rotational frequency to a second non-lighting period corresponding to the second rotational frequency, and the controller starts the first control in response to satisfying a condition where the deflection period of the mirror obtained based on a position signal of a rotor of the motor is longer than the second non-lighting period.

12 Claims, 10 Drawing Sheets

(51) Int. Cl.
- *H02P 6/08* (2016.01)
- *G03G 15/043* (2006.01)
- *H04N 1/29* (2006.01)
- *H02P 6/182* (2016.01)

(52) U.S. Cl.
CPC ............ *H04N 1/113* (2013.01); *H04N 1/295* (2013.01); *G03G 15/04036* (2013.01); *H02P 6/182* (2013.01); *H04N 2201/0094* (2013.01)

(56) References Cited

U.S. PATENT DOCUMENTS

| | | |
|---|---|---|
| 2012/0081496 A1 | 4/2012 | Nakazawa |
| 2015/0236627 A1 | 8/2015 | Hirata |
| 2016/0063362 A1* | 3/2016 | Abe .................. G06K 15/1219 399/51 |
| 2017/0269501 A1* | 9/2017 | Kamikura ............ G03G 15/043 |
| 2018/0106998 A1* | 4/2018 | Furuta .................. G02B 26/122 |

FOREIGN PATENT DOCUMENTS

| | | |
|---|---|---|
| JP | 2012-093739 A | 5/2012 |
| JP | 2015-152802 A | 8/2015 |

\* cited by examiner

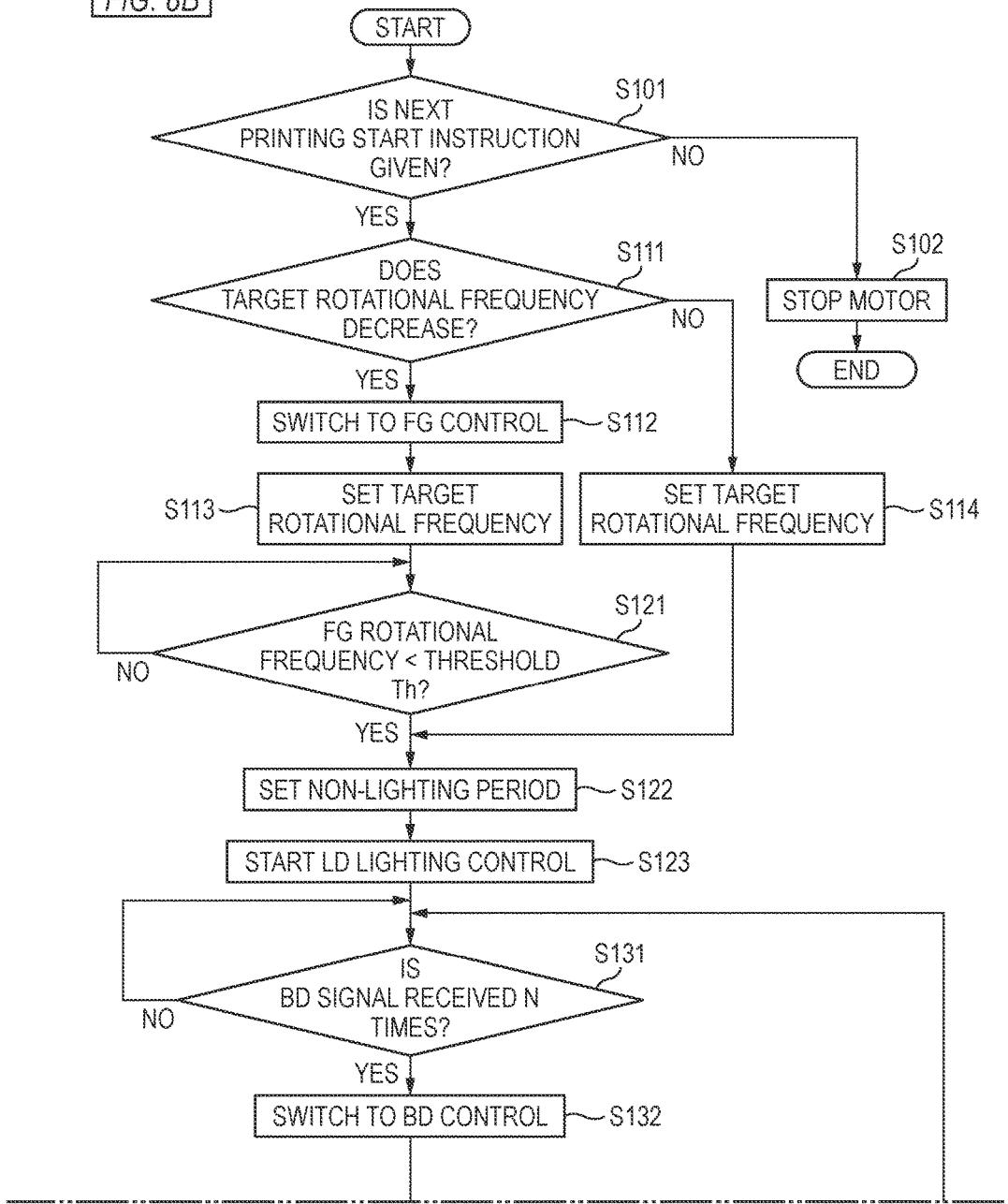

IMAGE FORMING APPARATUS AND METHOD OF CONTROLLING IMAGE FORMING APPARATUS INCLUDING EXPOSURE LIGHTING AND MIRROR ROTATION CONTROL

CROSS-REFERENCE TO RELATED APPLICATION

This application claims priority from Japanese Patent Application No. 2016-215736 filed on Nov. 3, 2016, the entire subject matter of which is incorporated herein by reference.

TECHNICAL FIELD

This disclosure relates to an image forming apparatus that forms an image by electrophotography and a method of controlling the image forming apparatus.

BACKGROUND

In the background art, there has been known an electrophotographic image forming apparatus including: a light source, which emits a light beam; a polygon mirror, which deflects the light beam; a motor, which rotates the polygon mirror; and a photosensitive member in which an image is formed by the light beam scanning the photosensitive member through the polygon mirror. In addition, a technique of controlling a motor, which rotates a polygon mirror is disclosed in the background art. The background art discloses an image forming apparatus that switches rotation control of a motor between control using a position signal (FG signal) of a rotor and control using a light receiving signal (BD signal) output from a sensor, which receives a light beam.

SUMMARY

However, the above-described technique has the following problem. That is, when a rotational frequency of a motor is detected using a BD signal while the rotational frequency is changing, a timing at which a light beam is emitted does not match a timing at which the light beam is detected by a sensor, and thus a BD signal may not be obtained. Therefore, when a light beam is continuously emitted until the rotational frequency of a motor reaches a target rotational frequency, a photosensitive member may be unnecessarily exposed to the light beam.

This disclosure has been made in order to solve the problem in the technique of the related art. That is, an object of this disclosure is to provide a technique capable of suppressing unnecessary exposure of a photosensitive member in an electrophotographic image forming apparatus.

An image forming apparatus of this disclosure includes: a photosensitive member; a light source configured to emit a light beam; a mirror configured to deflect the light beam; a motor configured to rotate the mirror; an optical sensor, which is positioned on an optical path of the light beam that has deflected by the mirror and outside of an exposure region of the photosensitive member and configured to output a light receiving signal in response to receive the light beam; and a controller. The controller executes lighting control of: causing the light source to light; causing, after lighting the light source and receiving the light receiving signal, the light source to enter into a non-lighting state during a non-lighting period that is shorter than a deflection period of the mirror at a target rotational frequency of the motor and is longer than an exposure period during which the light beam scans the exposure region of the photosensitive member at the target rotational frequency of the motor; and causing the light source to light again, after the non-lighting period, and first control of controlling a rotational frequency of the motor based on the light receiving signal during execution of the lighting control, wherein, when the target rotational frequency changes from a first rotational frequency to a second rotational frequency that is lower than the first rotational frequency, the controller executes speed change control of: stopping execution of the first control; and changing a rotational frequency of the motor, and non-lighting period change control of changing the non-lighting period in the lighting control from a first non-lighting period corresponding to the first rotational frequency to a second non-lighting period corresponding to the second rotational frequency. The controller starts the first control in response to satisfying a condition where the deflection period of the mirror obtained based on a position signal of a rotor of the motor is longer than the second non-lighting period.

In the image forming apparatus, during the first control of controlling the rotational frequency of the motor based on the light receiving signal output from the optical sensor, the non-lighting period during which the light source is made enter into the non-lighting state is set. As a result, unnecessary exposure of the photosensitive member to the light beam can be suppressed. After the light receiving signal is received, the non-lighting period is set to be shorter than the deflection period of the mirror at the target rotational frequency of the motor and to be longer than the period during which the light beam scans the exposure region of the photosensitive member at the target rotational frequency of the motor. As a result, the next reception timing of the light receiving signal is not likely to be delayed.

In addition, in a case where the target rotational frequency changes to a low value during the rotation of the motor, when the non-lighting period is changed to correspond to the new target rotational frequency, there may be a timing at which the light receiving signal cannot be received from the optical sensor. Therefore, in the image forming apparatus, when the target rotational frequency changes to a low value, the first control is stopped, and the rotational frequency of the motor changes. That is, in the image forming apparatus, a new target rotational frequency is set. Next, in the image forming apparatus, when the deflection period of the mirror obtained based on the position signal of the rotor of the motor is longer than a non-lighting period corresponding to the new target rotational frequency, the first control starts again. As a result, in the image forming apparatus, even in a case where the non-lighting period is set while the first control is being executed, the light receiving signal is highly likely to be received from the optical sensor. Accordingly, in the image forming apparatus, unnecessary exposure of the photosensitive member can be suppressed while suppressing deterioration in the accuracy of the rotation control of the motor.

An image forming apparatus according to this disclosure includes: a photosensitive member; a light source configured to emit a light beam; a mirror configured to deflect the light beam; a motor configured to rotate the mirror; an optical sensor, which is positioned on an optical path of the light beam that has deflected by the mirror and outside of an exposure region of the photosensitive member and configured to output a light receiving signal in response to receive the light beam; and a controller. The controller executes: lighting control of causing the light source to light; causing, after lighting the light source and receiving the light receiving signal, the light source enter into a non-lighting state during a non-lighting period that is shorter than a deflection period of the mirror at a target rotational frequency of the motor and is longer than an exposure period during which the light beam scans the exposure region of the photosensitive member at the target rotational frequency of the motor; and causing lighting the light source again after the non-lighting period, and first control of controlling a rotational frequency of the motor based on the light receiving signal during execution of the lighting control, wherein, when the target rotational frequency changes from a first rotational frequency to a second rotational frequency, the controller executes second control of: stopping execution of the first control; and controlling a rotational frequency of the motor based on a position signal of a rotor of the motor, and non-lighting period change control of changing the non-lighting period in the lighting control from a first non-lighting period corresponding to the first rotational frequency to a second non-lighting period corresponding to the second rotational frequency. The controller switches the second control to the first control in response to satisfying a condition where a rotational frequency of the motor obtained based on the light receiving signal is higher than a first constant times of a rotational frequency of the motor obtained based on the position signal, the first constant being less than 1.

In the image forming apparatus, during the first control of controlling the rotational frequency of the motor based on the light receiving signal output from the optical sensor, the non-lighting period during which the light source is made enter into the non-lighting state is set. As a result, unnecessary exposure of the photosensitive member to the light beam can be suppressed. After the light receiving signal is received, the non-lighting period is set to be shorter than the deflection period of the mirror at the target rotational frequency of the motor and to be longer than the period during which the light beam scans the exposure region of the photosensitive member at the target rotational frequency of the motor. As a result, the next reception timing of the light receiving signal is not likely to be delayed.

In addition, when the non-lighting period is set in a state where a difference between the current rotational frequency and the target rotational frequency is large during the rotation of the motor, there may be a timing at which the light receiving signal cannot be received from the optical sensor. In this case, the rotational frequency of the motor obtained based on the light receiving signal is lower than the actual rotational frequency. Therefore, at the beginning, the image forming apparatus controls the rotational frequency of the motor through the second control of controlling the rotational frequency of the motor based on the position signal of the rotor of the motor, and further executes the lighting control during the second control. Next, the image forming apparatus starts the first control of controlling the rotational frequency of the motor based on the light receiving signal output from the optical sensor when the rotational frequency of the motor obtained based on the light receiving signal is higher than a first constant times of the rotational frequency of the motor obtained based on the position signal in which the first constant is less than 1, that is, when a difference between the rotational frequency obtained based on the position signal and the rotational frequency obtained based on the light receiving signal becomes small. As a result, in the image forming apparatus, even in a case where the non-lighting period is set while the first control is being executed, the light receiving signal is highly likely to be received from the optical sensor. Accordingly, in the image forming apparatus, unnecessary exposure of the photosensitive member can be suppressed while suppressing deterioration in the accuracy of the rotation control of the motor.

A control method and a computer program for realizing the functions of the apparatus, and a computer-readable storage medium storing the computer program are also novel and useful.

According to this disclosure, a technique capable of suppressing unnecessary exposure of a photosensitive member in an electrophotographic image forming apparatus can be realized.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 8A and 8B are flowcharts illustrating a procedure of controlling rotation of a brushless motor according to a first embodiment.

DETAILED DESCRIPTION

Hereinafter, an embodiment of an image forming apparatus according to this disclosure will be described in detail with reference to the accompanying drawings. In the embodiment, this disclosure is applied to a laser printer capable of forming a color image.

Figure 1:
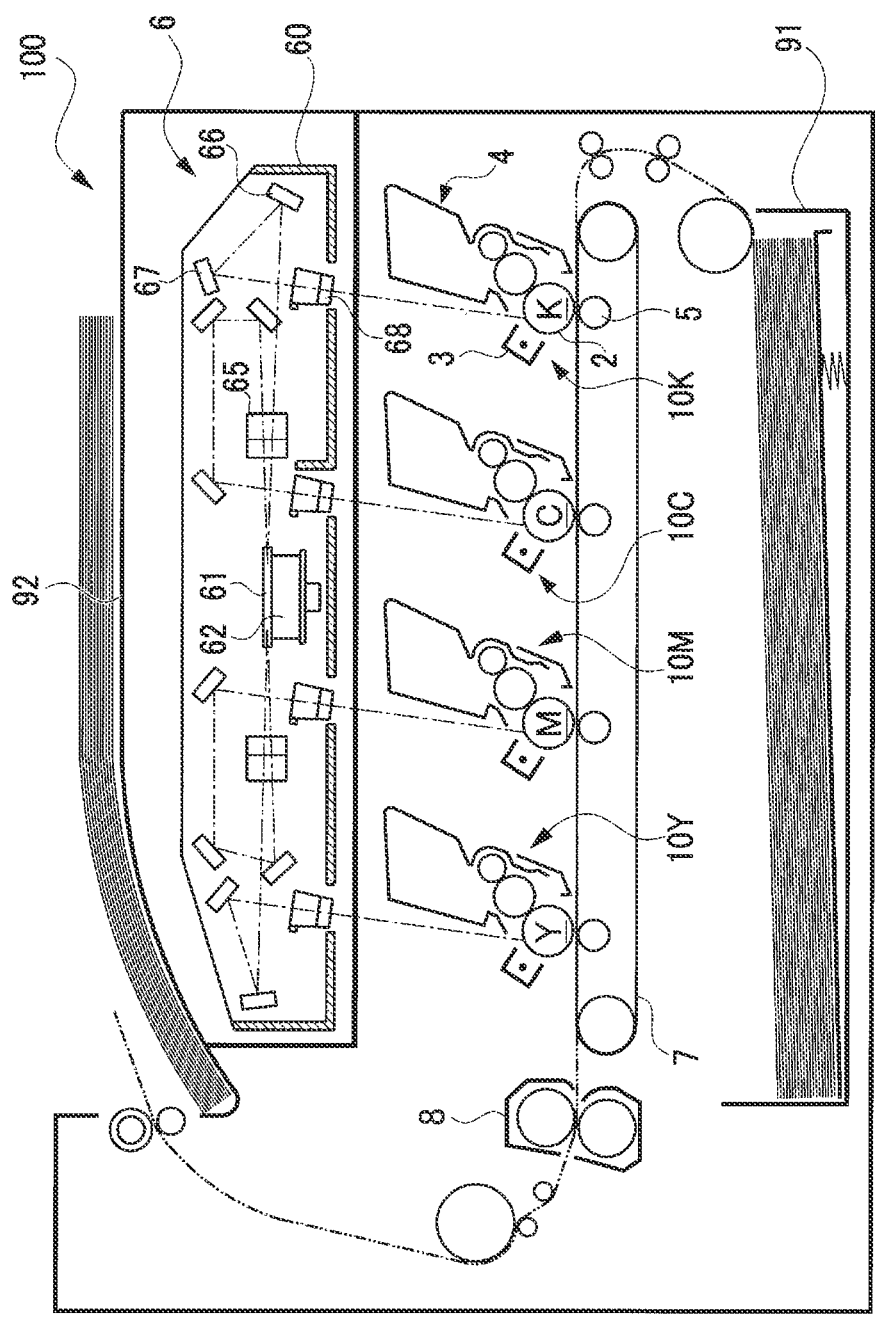
FIG. 1 is a cross-sectional view illustrating a schematic configuration of a printer according to an embodiment.

A printer 100 according to the embodiment is a so-called tandem color laser printer having a schematic configuration shown in FIG. 1. The printer 100 includes processing portions 10Y, 10M, 10C, and 10K corresponding to colors of yellow (Y), magenta (M), cyan (C), and black (K), respectively. The processing portion 10K includes a photosensitive member 2, a charger 3, and a developing device 4. The other color processing portions 10Y, 10M, and 10C also have the same configuration as described above. The photosensitive member 2 is a cylindrical photosensitive dram or an endless photosensitive belt, of which a surface is provided with a photosensitive layer. In addition, the printer 100 includes an exposure device 6, which is common to the respective colors, above the processing portions 10Y, 10M, 10C, and 10K for the respective colors. Further, the printer 100 includes a transfer belt 7, a fixing device 8, a sheet feed tray 91, and a sheet discharge tray 92.

The overall printing operation of the printer 100 will be described in brief. Hereinafter, image formation using the processing portion 10K will be described. During the printing operation, in the printer 100, the photosensitive member 2 is charged by the charger 3 and then is exposed by the exposure device 6. As a result, an electrostatic latent image based on image data is formed on a surface of the photosensitive member 2. Further, in the printer 100, the electrostatic latent image is developed by the developing device 4 to form a toner image.

In addition, in the printer 100, sheets stored in the sheet feed tray 91 are withdrawn one by one and transported to the transfer belt 7. The transfer belt 7 includes a transfer roller 5 inside of a position thereof where the photosensitive member 2 and the transfer belt 7 contact with each other, and transfers the toner image from the photosensitive member 2 to the sheet when the sheet passes through a gap between the photosensitive member 2 and the transfer roller 5. Further, in the printer 100, the toner image transferred to the sheet is fixed to the sheet by the fixing device 8. As a result, the sheet on which an image is formed is discharged to the sheet discharge tray 92.

In a case where color printing is executed, in the printer 100, respective color toner images are formed by the processing portions 10Y, 10M, and 10C for the other colors and are sequentially transferred to the sheet. As a result, the respective toner images are layered on the sheet. The layered toner images are fixed to the sheet to form a color image.

Next, a configuration of the exposure device 6 will be described with reference to FIGS. 1 and 2. The exposure device 6 includes a housing 60, a laser diode (LD) 63 that emits laser light, and various optical members for irradiating the photosensitive member 2 with the laser light emitted from the LD 63. For example, the printer 100 includes, as the various optical members, a polygon mirror 61, a coupling lens 64, an fθ lens 65, a reflecting mirror 66, a reflecting mirror 67, and a toric lens 68.

Figure 2:
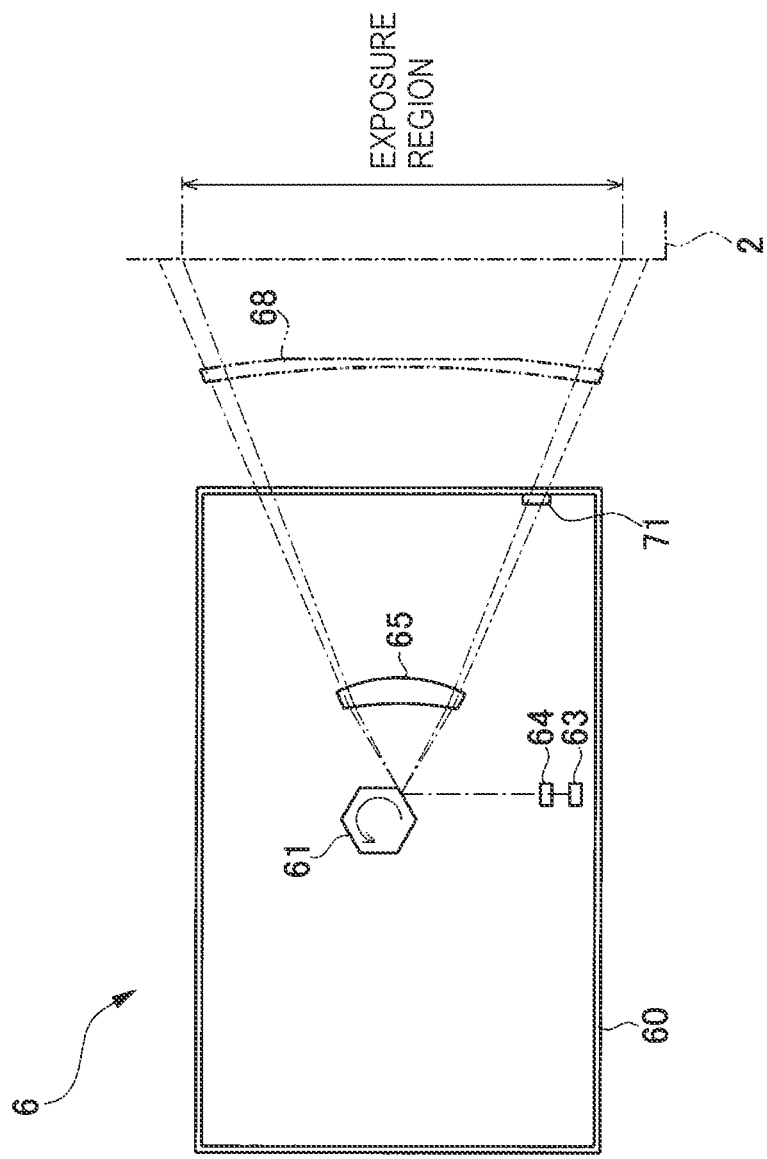
FIG. 2 is a diagram illustrating a schematic configuration of an exposure device.

FIG. 2 is a diagram illustrating portions of the exposure device 6 only relating to the processing portion 10K when seen from the top of FIG. 1 in which an optical path after the reflecting mirror 66 is virtually illustrated without being turned. A right end of FIG. 2 illustrates a virtual position of the photosensitive member 2.

Figure 3:
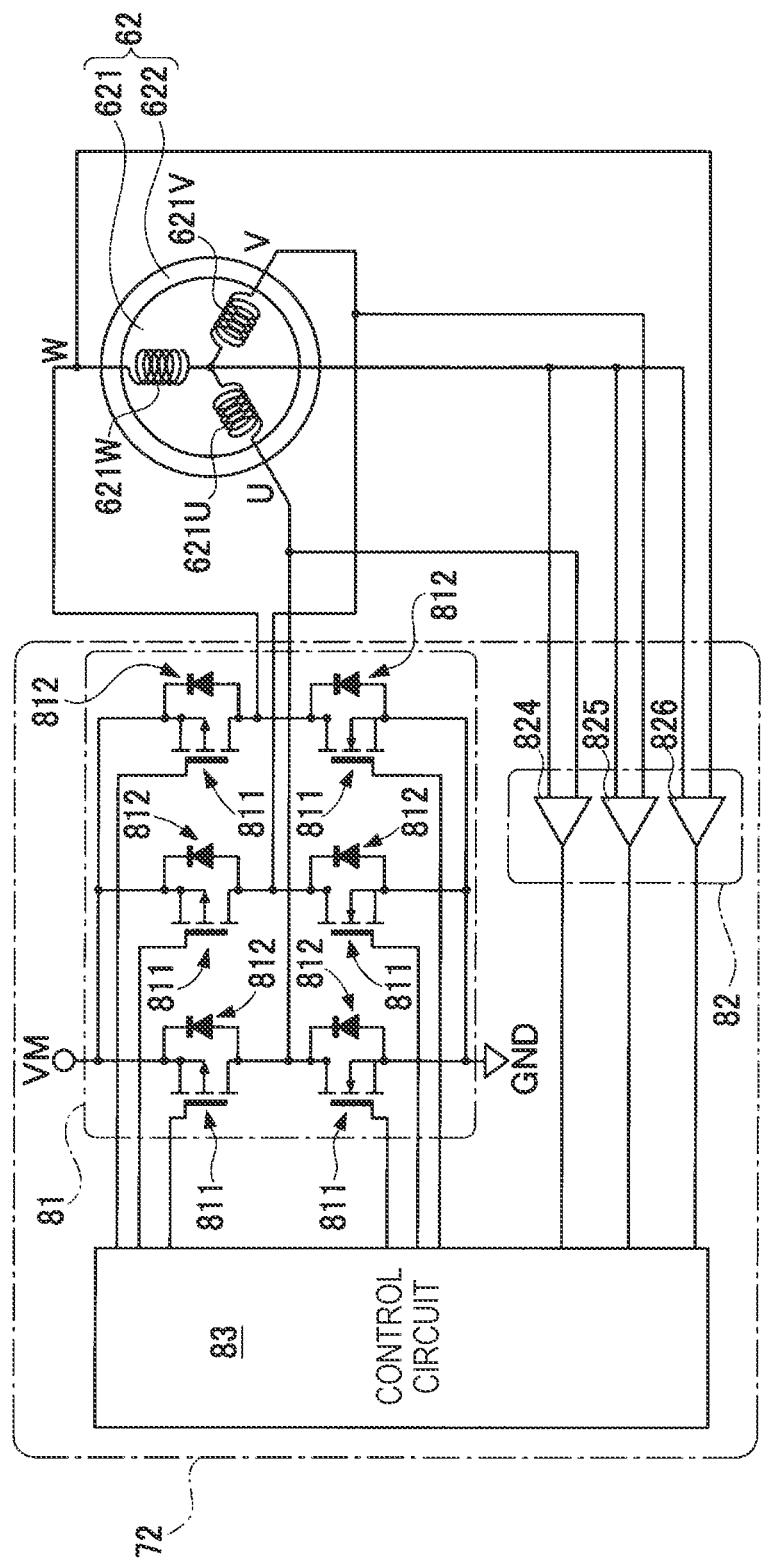
FIG. 3 is a schematic diagram illustrating a configuration of a brushless motor and a motor driving portion.

Further, the printer 100 includes a brushless motor 62 for rotating the polygon mirror 61. As illustrated in FIG. 3, the brushless motor 62 includes a stator 621 in which three-phase coils are connected to form a Y-connection; and a rotor 622 in which a permanent magnet is disposed. The rotor 622 includes a plurality of magnet poles so that an N-pole and an S-pole are alternately arranged in a peripheral direction of the rotor 622. The brushless motor 62 is an example of a motor. The stator 621 includes a U-phase coil 621U, a V-phase coil 621V, and a W-phase coil 621W. Respective first end portions of the U-phase coil 621U, the V-phase coil 621V, and the W-phase coil 621W are connected to each other at a neutral point. The polygon mirror 61 is attached to the rotor 622 of the brushless motor 62 and rotates together with the rotor 622. The details of control of the brushless motor 62 will be described below.

As illustrated in FIG. 2, in the exposure device 6, the laser light emitted from the LD 63 is converted into a light beam through the coupling lens 64, and the light beam is incident on the polygon mirror 61. The polygon mirror 61 has a regular hexagonal shape in a top view, and when forming an image, rotates at a constant high speed due to the brushless motor 62, and reflects the light beam. The light beam is deflected along with the rotation of the polygon mirror 61 and is scanned in a direction from the bottom to the top in FIG. 2. A combination of the LD 63 and the coupling lens 64 is an example of a light source, and the polygon mirror 61 is an example of a mirror.

As illustrated in FIG. 1, the light beam reflected from the polygon mirror 61 is irradiated on the photosensitive member 2 through the fθ lens 65, the reflecting mirrors 66 and 67, and the toric lens 68. That is, a portion of the photosensitive member 2 corresponding to one line in an axial direction is exposed to the light beam reflected from one surface of the polygon mirror 61 to form an electrostatic latent image corresponding to the one line. A region of the photosensitive member 2 in the axial direction which is exposed to the light beam, that is, a range of an image region where the electrostatic latent image based on image data is formed is illustrated as an exposure region in FIG. 2.

Further, in the printer 100, as illustrated in FIG. 2, an optical sensor 71 is provided on an inner wall surface of the housing 60 of the exposure device 6. The optical sensor 71 receives the light beam reflected from the polygon mirror 61 and outputs a BD (beam detect) signal of which an output value varies depending on whether or not the light beam is received. When the light beam is received, the BD signal is at an H level. When the light beam is not received, the BD signal is at an L level. The BD signal is used to determine, for example, a write timing of each scanning line using the light beam. The BD signal is an example of a light receiving signal.

Figure 4:
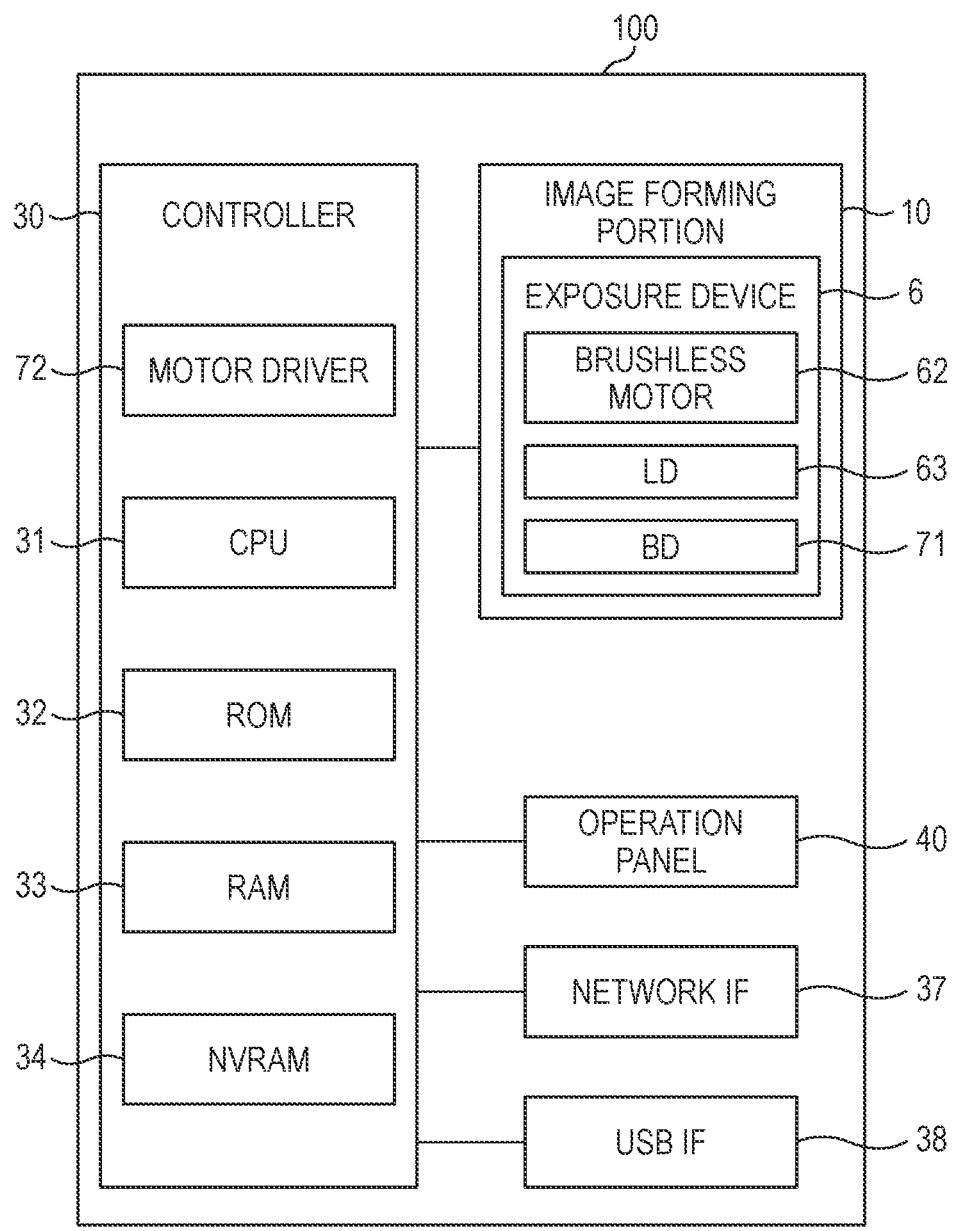
FIG. 4 is a block diagram illustrating an electrical configuration of the printer.

Next, an electrical configuration of the printer 100 will be described. As illustrated in FIG. 4, the printer 100 includes a controller 30 that includes a CPU 31, a ROM 32, a RAM 33, a non-volatile RAM (NVRAM) 34, and a motor driver 72. In addition, the printer 100 includes: an image forming portion 10 that includes the respective processing portions 10Y, 10M, 10C, and 10K for the respective colors and the exposure device 6; an operation panel 40; a network interface 37; and a USB interface 38, and these respective components are electrically connected to the controller 30.

In the ROM 32, various control programs for controlling the printer 100, various settings, initial values, and the like are stored. The RAM 33 is used as a work area from which various control programs are read or as a storage area in which data is temporarily stored. The CPU 31 controls the respective components of the printer 100 according to the control programs read from the ROM 32 while storing processing results of the control programs in the RAM 33 or the NVRAM 34. The controller 30 in FIG. 4 is a collective term for various kinds of hardware such as the CPU 31 used to control the printer 100. In practice, the controller 30 is not limited to one kind of hardware present in the printer 100. The motor driver 72 includes an inverter circuit 81 and a control circuit 83 (refer to FIG. 3) which switch driving of the respective coils of the brushless motor 62, and controls the rotation of the brushless motor 62.

The network interface 37 is hardware for communication with a device connected through a network. The USB interface 38 is hardware for communication with a device connected according to the USB specifications. The operation panel 40 is hardware having a function of displaying a notification to a user and a function of receiving an instruction input by a user.

The exposure device 6 includes the brushless motor 62, the LD 63, the optical sensor 71.

Next, the motor driving portion 72 of the brushless motor 62 will be described. As illustrated in FIG. 3, the motor driving portion 72 includes: the inverter circuit 81 that switches between energization states to the respective coils 621U, 621V, and 621W to selectively drive the respective coils 621U, 621V, and 621W; a comparing portion 82 that includes plural comparators; and the control circuit 83 that is electrically connected to the inverter circuit 81 and the comparing portion 82.

The inverter circuit 81 is disposed between a power supply voltage (VM) and a ground voltage (GND), and selectively applies a voltage to the respective coils 621U, 621V, and 621W based on a driving signal output from the control circuit 83. The comparing portion 82 includes a UC comparator 824 that compares a U-phase voltage to a neutral point voltage, a VC comparator 825 that compares a V-phase voltage to a neutral point voltage, and a WC comparator 826 that compares a W-phase voltage to a neutral point voltage. Based on an output signal from the comparing portion 82, the control circuit 83 outputs a signal for switching the driving of the respective coils 621U, 621V, and 621W to the inverter circuit 81 such that the brushless motor 62 is rotated.

Figure 5:
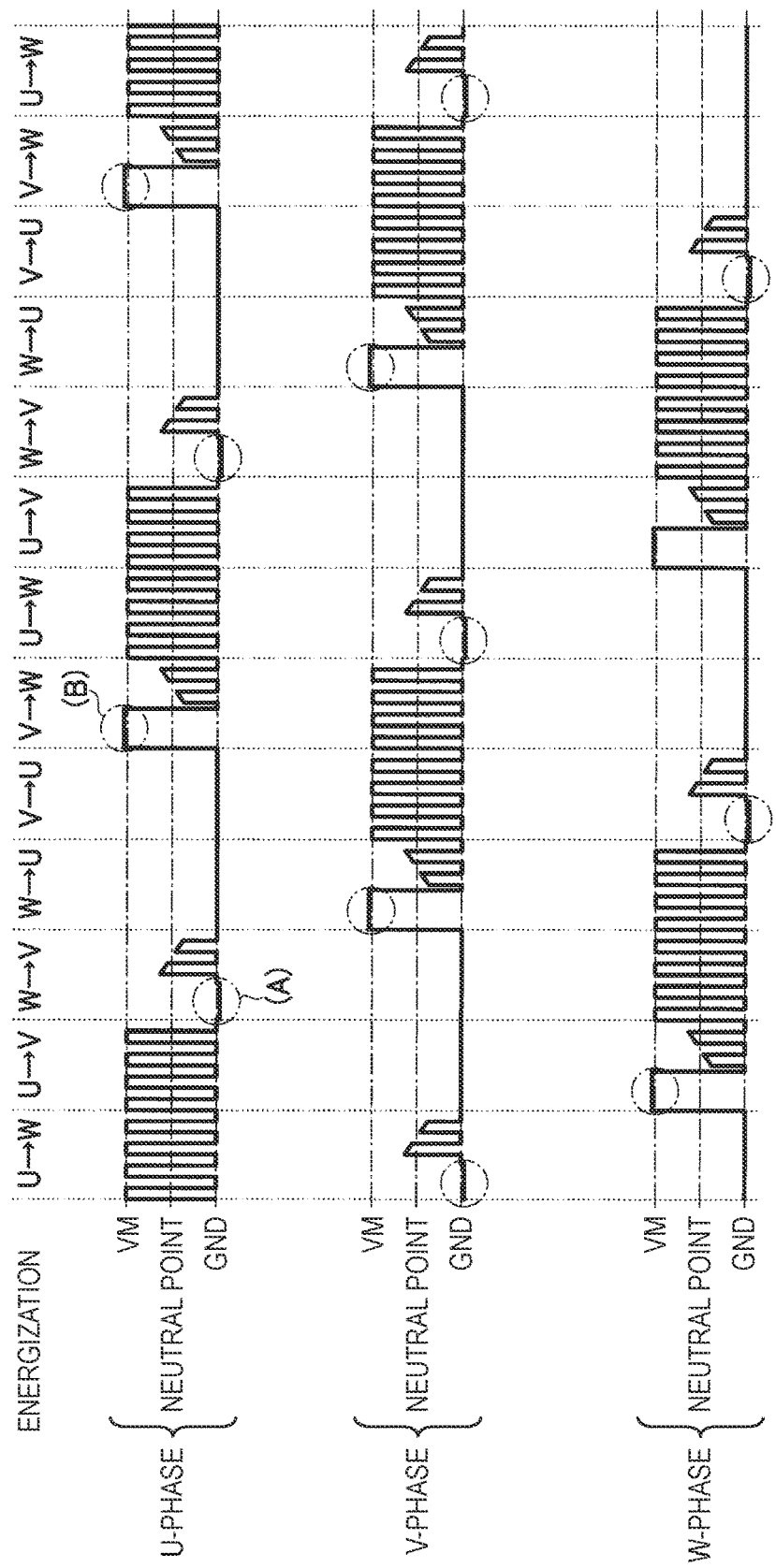
FIG. 5 is a waveform chart illustrating an example of induced voltages generated in coils of the brushless motor.

The motor driving portion 72 detects a position of the rotor 622 without using a position detecting element such as a hall element. When the rotor 622 rotates, the S-pole and the N-pole of the rotor 622 alternately approach the respective coils 621U, 621V, and 621W constituting the stator 621. Accordingly, a magnetic flux in each of the coils 621U, 621V, and 621W changes, and an induced voltage is generated in the coil. For example, as illustrated in FIG. 5, the induced voltage shows a waveform that regularly changes between different levels of a case where the S-pole approaches the coil and a case where the N-pole approaches the coil. Therefore, by detecting the induced voltage, the motor driving portion 72 can detect a position of the rotor 622, that is, whether the S-pole or the N-pole approaches each of the coils 621U, 621V, and 621W.

The control circuit 83 switches the driving of the three-phase coils 621U, 621V, and 621W based on the comparison between the induced voltage of each of the coils 621U, 621V, and 621W and the neutral point voltage of the Y-connection. That is, in a case where the induced voltage reaches the neutral point voltage, the control circuit 83 switches a coil that is a target to be driven when receiving a signal indicating that the induced voltage reaches the neutral point voltage. The fact that induced voltage reaches the neutral point voltage represents that there is a change in magnitude relationship between the induced voltage and the neutral point voltage. In addition, the signal indicating that the induced voltage reaches the neutral point voltage is a so-called zero crossing signal. In this specification, this zero crossing signal is set as an FG signal. The FG signal is an example of a position signal of a rotor of a motor.

In the motor driving portion 72 according to the embodiment, as illustrated in FIG. 5, the energization is switched in order of U→W, U→V, W→V, W→U, V→U, and V→W, returns to U→W after V→W, and is repeatedly switched in the same order. For example, U→W represents an energization state where a current flows from the U-phase to the W-phase. That is, the positive side (high voltage side) is switched in order of U-phase→W-phase→V-phase. At timings between the switching timings of the positive side, the negative side (low voltage side) is switched in order of U-phase→W-phase→V-phase. As a result, the brushless motor 62 according to the embodiment switches the target to be driven in order of the U-phase, the W-phase, and the V-phase.

The motor driving portion 72 controls the rotational frequency of the brushless motor 62. The rotational frequency represents al a number of revolutions of the brushless motor 62 per unit time. In this specification, the rotational frequency of the brushless motor 62 or the polygon mirror 61 per unit time will be simply referred to as the rotational frequency. When the rotational frequency changes, the motor driving portion 72 changes a duty cycle of the energization period of each the coil 621U, 621V, or 621W. Specifically, the motor driving portion 72 obtains the current rotational frequency of the brushless motor 62 and compares the obtained rotational frequency to a target rotational frequency. For acceleration, the duty cycle of the energization period of each of the coils 621U, 621V, and 621W is increased. On the other hand, for deceleration, the duty cycle of the energization period of each of the coils 621U, 621V, and 621W is decreased. As a result, the motor driving portion 72 executes the acceleration, deceleration, constant speed rotation, and the like of the brushless motor 62.

As control of the rotational frequency of the brushless motor 62, the printer 100 can execute two kinds of control including control of adjusting the rotational frequency through feedback of the BD signal, and control of adjusting the rotational frequency through feedback of the FG signal. In this specification, the former control will be referred to as "BD control", and the latter control will be referred to as "FG control". The printer 100 can select the kind of the control of the rotational frequency of the brushless motor 62 as necessary. The BD control is an example of first control, and the FG control is an example of second control.

In the inverter circuit 81 of the brushless motor 62, as illustrated in FIG. 3, switching elements 811 and free wheeling diodes 812 that are connected in parallel to the switching element 811 are provided. As a result, after switching the positive side to the target to be driven based on the signal output from the control circuit 83, a counter electromotive current generated from the coil returns to a power supply VM through the positive-side free wheeling diode 812. In addition, after switching the negative side to the target to be driven, a counter electromotive current generated from the coil returns to GND through the negative-side free wheeling diode 812. As a result, immediately after switching U→V to W→V in the U-phase, a counter electromotive voltage lower than the GND voltage is generated from a terminal of the U-phase as indicated by (A) of FIG. 5. In addition, immediately after switching V→U to V→W in the U-phase, a counter electromotive voltage higher than the VM voltage is generated from a terminal of the U-phase as indicated by (B) of FIG. 5. During a period where the counter electromotive voltage is generated, it is necessary to execute mask processing so as not to erroneously detect the FG signal. In addition, electrical noise is likely to be added to the induced voltage, and an error may be generated in the FG signal. Therefore, in the FG control using the FG signal, the accuracy tends to be lower than that of the BD control.

On the other hand, in the BD control, the BD signal is used. Therefore, the BD control is not affected by the electrical noise. However, it is necessary to use the LD 63 to output the laser light, and the photosensitive member 2 is frequently irradiated with the light beam. As a result, deterioration of the photosensitive member 2 or toner deposition caused by unnecessary formation of a latent image may occur. In addition, the output of the LD 63 may vary due to heat generated by continuous lighting of the LD 63.

Figure 6:
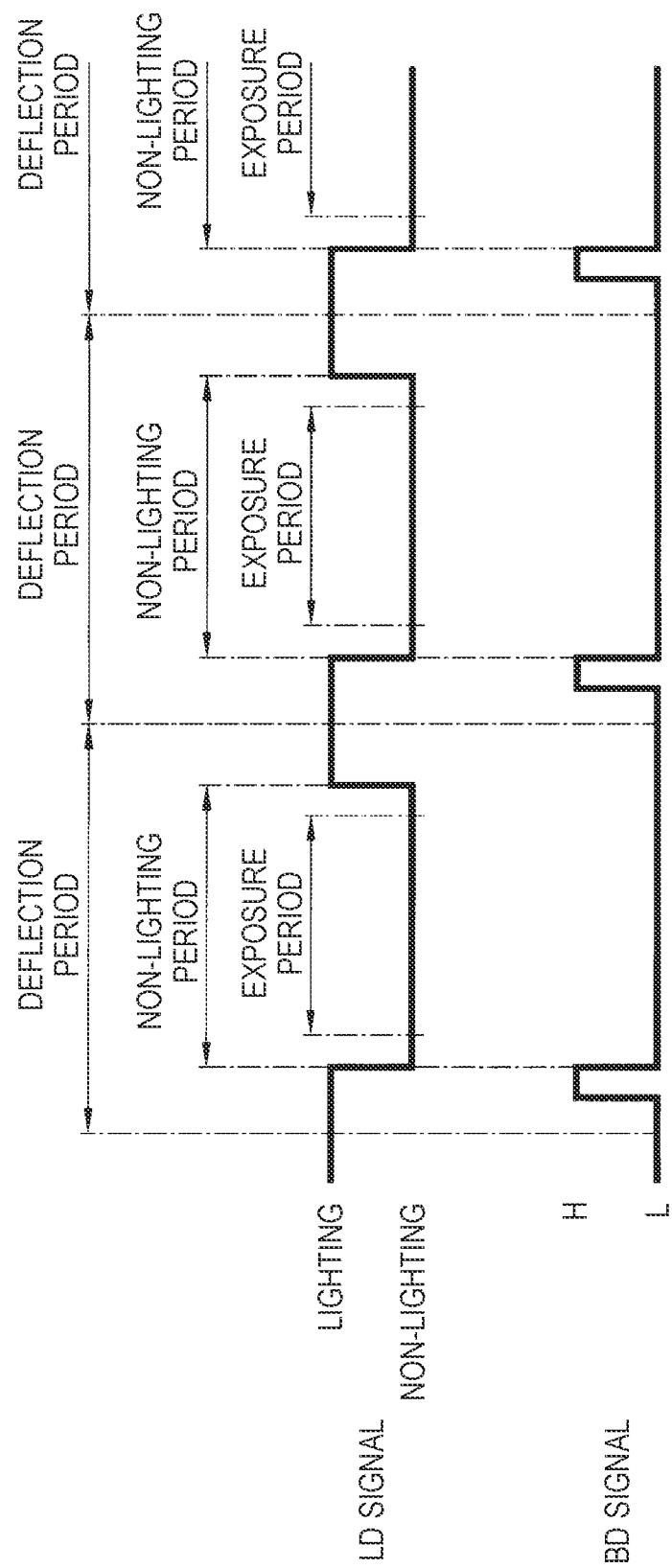
FIG. 6 is a diagram illustrating a relationship (during a normal operation) between a BD signal during BD control and a non-lighting period of a laser diode.

Therefore, as lighting control of the LD 63, in the printer 100, after making the LD 63 enter into a lighting state and receiving the BD signal, a non-lighting period during which the LD 63 is made enter into a non-lighting state is set as illustrated in FIG. 6. After the non-lighting period, the LD 63 is made enter into the lighting state again. The non-lighting period is a fixed period of time that is determined depending on the target rotational frequency of the brushless motor 62. More specifically, the non-lighting period is shorter than a deflection period of the polygon mirror 61 at the target rotational frequency of the brushless motor 62 and is longer than an exposure period during which the light beam scans the exposure region of the photosensitive member 2 at the target rotational frequency of the brushless motor 62. The deflection period of the polygon mirror 61 is a period during which the light beam is deflected by one surface of the polygon mirror 61, and is obtained by dividing a period during which the polygon mirror 61 rotates once by the number of surfaces of the polygon mirror 61. By setting the non-lighting period, unnecessary exposure of the photosensitive member 2 is suppressed.

Figure 7:
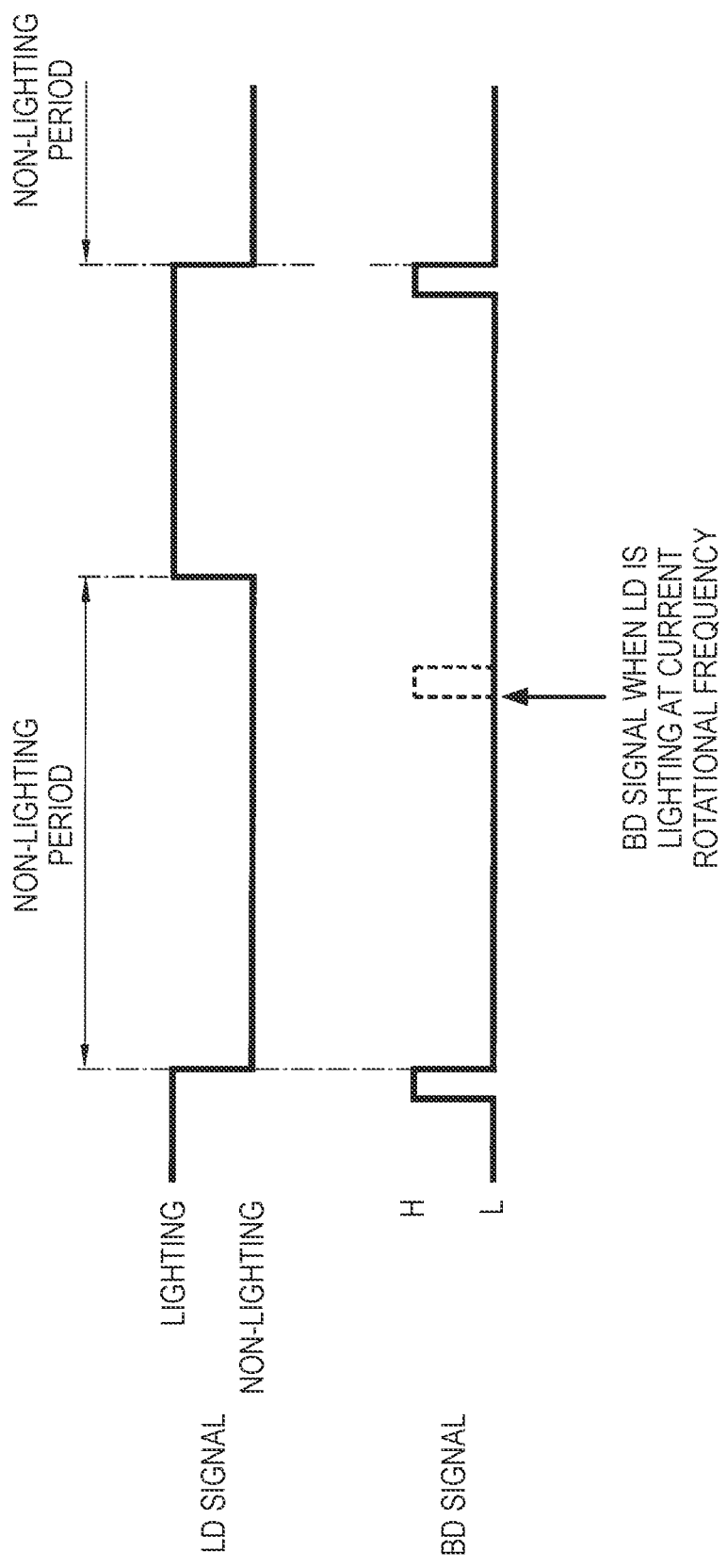
FIG. 7 is a diagram illustrating a relationship (during an abnormal operation) between a BD signal during BD control and a non-lighting period of a laser diode.

However, in a case where the non-lighting period is set, the BD signal may not be obtained when the target rotational frequency of the brushless motor 62 changes. For example, in a case where the target rotational frequency changes from a first rotational frequency to a second rotational frequency that is lower than the first rotational frequency while the brushless motor 62 is rotating at the first rotational frequency through the BD control, it is also necessary to increase the non-lighting period according to the changed target rotational frequency. In this case, immediately after the target rotational frequency changes, the actual rotational frequency of the brushless motor 62 is much higher than the target rotational frequency, and an output timing of the BD signal may come during the non-lighting period as illustrated in FIG. 7. In this case, the BD signal cannot be obtained at this output timing, and it is necessary to receive the BD signal at the next output timing. As a result, the rotational frequency obtained based on the BD signal is lower than the actual rotational frequency. Thus, control for acceleration may be executed at a timing at which deceleration should be executed, and the brushless motor 62 may go out of control.

Therefore, in a first embodiment, when the target rotational frequency of the brushless motor 62 decreases, the printer 100 starts deceleration of the brushless motor 62 first through the FG control without executing the BD control. Next, the printer 100 switches the rotation control of the brushless motor 62 from the FG control to the BD control in response to satisfying a condition where the current rotational frequency of the brushless motor 62 obtained based on the FG signal reaches a rotational frequency where the BD signal can be obtained even when the non-lighting period corresponding to the target rotational frequency is set, specifically in response to satisfying a condition where the brushless motor 62 decelerates to a rotational frequency where the deflection period of the polygon mirror 61 is longer than the non-lighting period of the target rotational frequency.

Figure 8B:
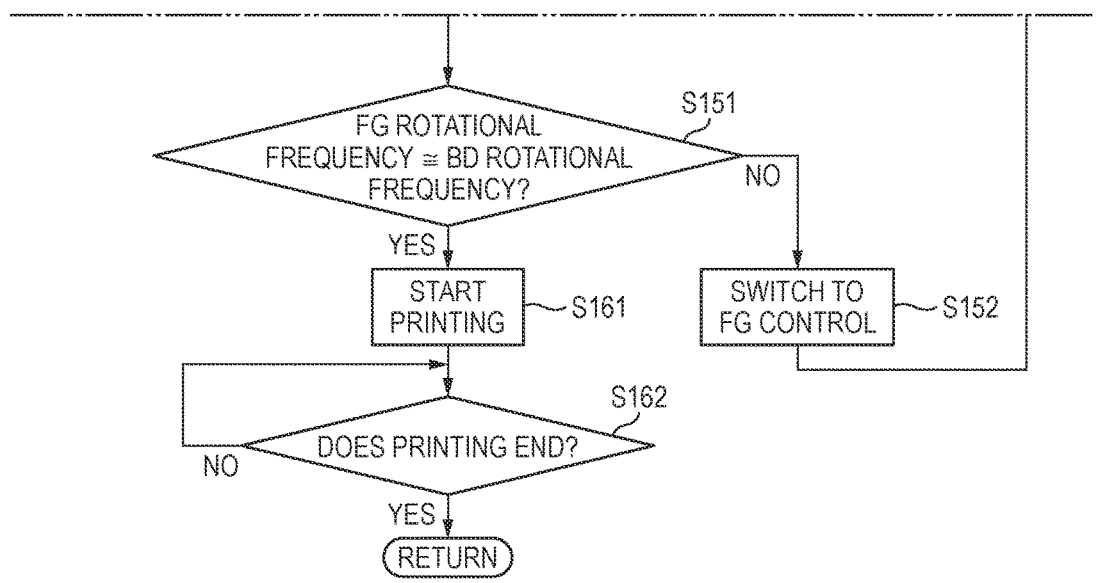

Next, the control of the brushless motor 62 will be described with reference to a flowchart of FIGS. 8A and 8B. The control illustrated in the flowchart of FIGS. 8A and 8B is executed by the CPU 31 after one printing job is completed.

After one printing job is completed, first, the CPU 31 determines whether or not the next printing start instruction is given, that is, whether or not the next printing job is received (S101). When the next printing start instruction is not given (S101: NO), the CPU 31 outputs a motor stop instruction for stopping the brushless motor 62 to the motor driving portion 72 (S102). After S102, the CPU 31 ends the control illustrated in the flowchart of FIGS. 8A and 8B.

When the next printing start instruction is given (S101: YES), the CPU 31 determines whether or not the target rotational frequency of the brushless motor 62 decreases, that is, whether or not the target rotational frequency of the brushless motor 62 for the next printing is lower than the target rotational frequency of the brushless motor 62 for the previous printing (S111). When high-speed printing changes to low-speed printing, the target rotational frequency of the brushless motor 62 is decreased. The low-speed printing corresponds to printing on a special sheet such as cardboard or printing in a silent mode where noise is suppressed during printing.

When the target rotational frequency of the brushless motor 62 decreases (S111: YES), the CPU 31 switches the control of the rotational frequency of the brushless motor 62 from the BD control to the FG control (S112). That is, the CPU 31 stops the BD control and starts the FG control. By stopping the BD control, the CPU 31 also stops the lighting control of the LD 63.

After S112, the CPU 31 sets a new target rotational frequency of the brushless motor 62 corresponding to the next printing job (S113). S112 and S113 may be executed in a reverse order or at the same time. Even when the target rotational frequency of the brushless motor 62 does not decrease (S111: NO), the CPU 31 sets a new target rotational frequency of the brushless motor 62 corresponding to the next printing job (S114). As a result, the brushless motor 62 starts to be decelerated. When the rotational frequency of the brushless motor 62 changes, the motor driving portion 72 changes an applied voltages to each of the coils 621U, 621V, and 621W, that is, a PWM duty cycle.

After S113, the CPU 31 determines whether or not an FG rotational frequency, which is the current rotational frequency of the polygon mirror 61 obtained based on the FG signal, is lower than a threshold Th (S121). The threshold Th is a value for determining that the deflection period of the polygon mirror 61 is longer than the non-lighting period of the target rotational frequency, and varies depending on the target rotational frequency.

Specifically, the threshold Th in S121 satisfies the following Expression (1).

Threshold $Th$=Rotational Frequency in Non-Lighting Period$\times A$ ($A$ represents a constant of 1 or less)  (1)

Non-Lighting Period: 1/(Non-Lighting Period at Target Rotational Frequency$\times$Number of Polygon Surfaces) [rps]

The threshold Th is not particularly limited as long as it can be determined that the brushless motor 62 is decelerated to a rotational frequency at which the deflection period of the polygon mirror 61 is longer than the non-lighting period of the target rotational frequency. For example, the threshold Th may be a value of a constant times of the target rotational frequency, the constant being 1 or less.

When the FG rotational frequency is the threshold Th or higher (S121: NO), the CPU 31 repeats the determination of S121. When the FG rotational frequency is lower than the threshold Th (S121: YES), or after S114, the CPU 31 sets a non-lighting period corresponding to the target rotational frequency for the next printing (S122). The CPU 31 starts the lighting control of the LD 63 (S123). That is, the CPU 31 makes the LD 63 enter into the lighting state, makes the LD 63 enter into the non-lighting state after receiving the BD signal, and makes the LD 63 enter into the lighting state again after the non-lighting period set in S122. In S123, control of repeating the lighting state and the non-lighting state of the LD 63 starts.

After S123, the CPU 31 determines whether or not the BD signal is received N times from the start of the lighting control of the LD 63 in S123 (S131). When the BD signal is not received N times (S131: NO), the CPU 31 repeats the determination of S131. When the BD signal is received N times (S131: YES), the CPU 31 switches the control of the rotational frequency of the brushless motor 62 from the FG control to the BD control (S132).

After S132, the CPU 31 determines whether or not the FG rotational frequency, which is the current rotational frequency of the polygon mirror 61 obtained based on the FG signal, is similar to a BD rotational frequency which is the current rotational frequency of the polygon mirror 61 obtained based on the BD signal (S151). Specifically, in S151, when the BD rotational frequency is lower than a constant times of the FG rotational frequency in which the constant is less than 1, the CPU 31 determines that the FG rotational frequency is similar to the BD rotational frequency. For example, in the embodiment, the constant is ½.

When the FG rotational frequency is similar to the BD rotational frequency (S151: YES), the CPU 31 determines that the BD control is stable, and starts printing (S161). When the FG rotational frequency is not similar to the BD rotational frequency (S151: NO), the BD signal may not be received in the non-lighting period. Therefore, the CPU 31 switches the control of the rotational frequency of the brushless motor 62 from the BD control to the FG control (S152). After S152, the CPU 31 repeats the determination of S131.

After starting printing in S161, the CPU 31 determines whether or not the printing ends (S162). When the printing does not end (S162: NO), the CPU 31 repeats the determination of S162. On the other hand, when the printing ends (S162: YES), the CPU 31 ends the control illustrated in the flowchart of FIGS. 8A and 8B based on the end of the previous printing job, and starts the control illustrated in the flowchart of FIGS. 8A and 8B based on the end of the current printing job.

In the control according to the first embodiment described above in detail, the non-lighting period during which the LD 63 is made enter into the non-lighting state is set as the lighting control of the LD 63. As a result, unnecessary exposure of the photosensitive member 2 to the light beam can be suppressed. Thus, deterioration of the photosensitive member 2 or toner deposition caused by unnecessary formation of a latent image can be suppressed. After the BD signal is received, the non-lighting period is set to be shorter than the deflection period of the polygon mirror 61 at the target rotational frequency of the brushless motor 62 and is longer than the exposure period during which the light beam scans the exposure region of the photosensitive member 2 at the target rotational frequency of the brushless motor 62. As a result, the next reception timing of the BD signal is not likely to be delayed.

In addition, when the target rotational frequency of the brushless motor 62 changes to a value lower than the current target rotational frequency, the printer 100 stops the BD control. When the FG rotational frequency is lower than the threshold Th, that is, when the deflection period of the polygon mirror 61 obtained based on the FG signal is longer than a non-lighting period corresponding to a new target rotational frequency, the BD control starts again. As a result, in the printer 100, even in a case where the non-lighting period is set as the lighting control of the LD 63 while the BD control is being executed, the light receiving signal is highly likely to be received from the optical sensor 71. Accordingly, in the printer 100, unnecessary exposure of the photosensitive member 2 can be suppressed while suppressing deterioration in the accuracy of the rotation control of the brushless motor 62.

Next, control according to a second embodiment will be described. In the control according to the second embodiment, as in the first embodiment, the printer 100 stops the BD control first, and starts control of decelerating the brushless motor 62 through the FG control. Next, the rotation control of the brushless motor 62 is switched from the FG control to the BD control in response to satisfying a condition where the FG rotational frequency, which is the current rotational frequency of the polygon mirror 61 obtained based on the FG signal, is similar to the BD rotational frequency which is the current rotational frequency of the polygon mirror 61 obtained based on the BD signal. This point is different from the first embodiment in which the condition for switching the FG control to the BD control is that the current deflection period of the polygon mirror 61 obtained based on the FG signal is longer than the non-lighting period corresponding to the target rotational frequency.

Figure 9:
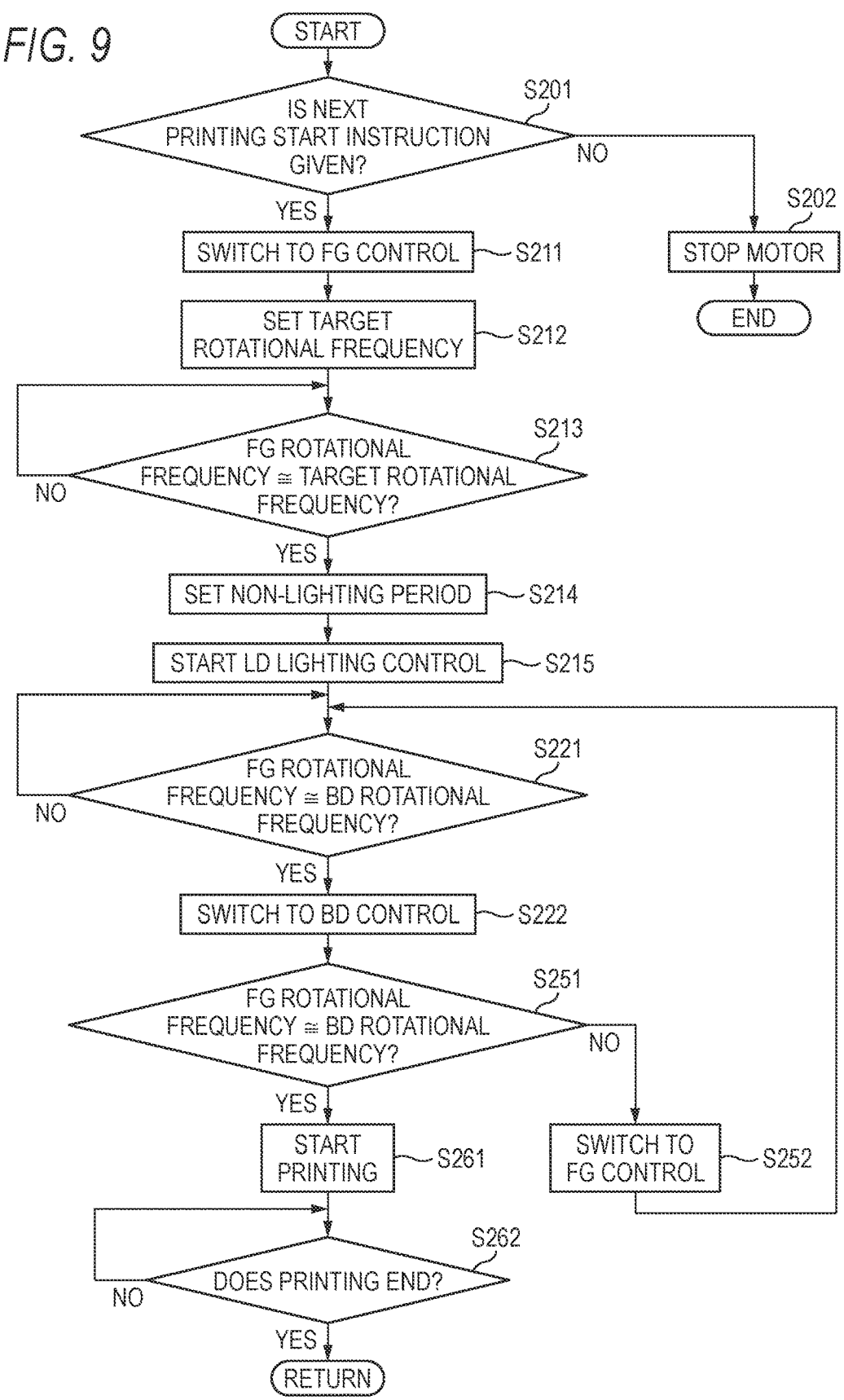
FIG. 9 is a flowchart illustrating a procedure of controlling rotation of a brushless motor according to a second embodiment.]

In the second embodiment, the control of the printer 100 will be described with reference to the flowchart of FIG. 9. As in the first embodiment, the control illustrated in the flowchart of FIG. 9 is also executed by the CPU 31 after one printing job is completed.

After one printing job is completed, first, the CPU 31 determines whether or not the next printing start instruction is given (S201). When the next printing start instruction is not given (S201: NO), the CPU 31 outputs the motor stop instruction to the motor driving portion 72 (S202). After S202, the CPU 31 ends the control illustrated in the flowchart of FIG. 9.

When the next printing start instruction is given (S201: YES), the CPU 31 switches the control of the rotational frequency of the brushless motor 62 from the BD control to the FG control (S211). That is, the CPU 31 stops the BD control and starts the FG control. By stopping the BD control, the CPU 31 also stops the lighting control of the LD 63.

After S211, the CPU 31 sets a new target rotational frequency of the brushless motor 62 corresponding to the next printing job (S212). As a result, the rotational frequency of the brushless motor 62 starts to approach the target rotational frequency for the next printing.

After S212, the CPU 31 determines whether or not the FG rotational frequency, which is the current rotational frequency of the polygon mirror 61 obtained based on the FG signal, is similar to a target rotational frequency of the polygon mirror 61 corresponding to the target rotational frequency of the brushless motor 62 (S213). Specifically, in S213, when the FG rotational frequency is within a predetermined range from the target rotational frequency, the CPU 31 determines that the FG rotational frequency is similar to the target rotational frequency.

When the FG rotational frequency is not similar to the target rotational frequency (S213: NO), the CPU 31 repeats the determination of S213. When the FG rotational frequency is similar to the target rotational frequency (S213: YES), the CPU 31 sets a non-lighting period corresponding to the target rotational frequency for the next printing (S214). The CPU 31 starts the lighting control of the LD 63 (S215).

After S215, the CPU 31 determines whether or not the FG rotational frequency is similar to the BD rotational frequency which is the current rotational frequency of the polygon mirror 61 obtained based on the BD signal (S221). Specifically, in S221, when the BD rotational frequency is higher than a constant times of the FG rotational frequency in which the constant is less than 1, the CPU 31 determines that the FG rotational frequency is similar to the BD rotational frequency. For example, in the embodiment, the constant is ½.

When the FG rotational frequency is not similar to the BD rotational frequency (S221: NO), the CPU 31 repeats the determination of S221. On the other hand, when the FG rotational frequency is similar to the BD rotational frequency (S221: YES), the CPU 31 switches the control of the rotational frequency of the brushless motor 62 from the FG control to the BD control (S222).

After S222, the CPU 31 determines whether or not the FG rotational frequency is similar to the BD rotational frequency (S251). The determination of S251 is the same as that of S151. The constant used in S251 may be the same as or different from the constant used in S221.

When the FG rotational frequency is similar to the BD rotational frequency (S251: YES), the CPU 31 determines that the BD control is stable, and starts printing (S261). When the FG rotational frequency is not similar to the BD rotational frequency (S251: NO), the CPU 31 switches the control of the rotational frequency of the brushless motor 62 from the BD control to the FG control (S252). After S252, the CPU 31 repeats the determination of S221.

After starting printing in S261, the CPU 31 determines whether or not the printing ends (S262). When the printing does not end (S262: NO), the CPU 31 repeats the determination of S262. On the other hand, when the printing ends (S262: YES), the CPU 31 ends the control illustrated in the flowchart of FIG. 9 based on the end of the previous printing job, and starts the control illustrated in the flowchart of FIG. 9 based on the end of the current printing job.

In the control according to the second embodiment described above in detail, as in the first embodiment, the non-lighting period during which the LD 63 is made enter into the non-lighting state is set as the lighting control of the LD 63. As a result, unnecessary exposure of the photosensitive member 2 to the light beam can be suppressed. Thus, deterioration of the photosensitive member 2 or toner deposition caused by unnecessary formation of a latent image can be suppressed. As in the first embodiment, after the BD signal is received, the non-lighting period is set to be shorter than the deflection period of the polygon mirror 61 at the target rotational frequency of the brushless motor 62 and to be longer than the exposure period during which the light beam scans the exposure region of the photosensitive member 2 at the target rotational frequency of the brushless motor 62. As a result, the next reception timing of the BD signal is not likely to be delayed.

In addition, at the beginning, the printer 100 controls the brushless motor 62 through the FG control and further executes the lighting control of the LD 63 during the FG control. Next, the printer 100 starts the BD control after a difference between the FG rotational frequency, which is the current rotational frequency of the polygon mirror 61 obtained based on the FG signal, and the BD rotational frequency, which is the current rotational frequency of the polygon mirror 61 obtained based on the BD signal, becomes small. As a result, in the printer 100, even in a case where the non-lighting period is provided while the BD control is being executed, the light receiving signal is highly likely to be received from the optical sensor 71. Accordingly, in the printer 100, unnecessary exposure of the photosensitive member 2 can be suppressed while suppressing deterioration in the accuracy of the rotation control of the brushless motor 62.

The embodiment is merely exemplary, and this disclosure is not limited thereto. Accordingly, it is obvious that various improvements and changes can be made within a scope not departing from the gist of this disclosure. For example, the image forming apparatus is not limited to a printer and is applicable to any apparatus having a function of forming an image by electrophotography, for example, a copying machine, a FAX machine, or a multifunction peripheral. In addition, the printer 100 according to the embodiment is a color printer and includes the four processing portions 10K, 10C, 10M, and 10Y. However, the printer may be a monochrome printer including one processing portion.

In addition, in the embodiment, the brushless motor 62 does not include a position detecting element such as a hall element, and thus a zero-crossing detection value of an induced voltage is used as the position signal of the rotor 622 of the brushless motor 62. However, when the brushless motor 62 includes a position detecting element, an output signal of the position detecting element may be used.

In addition, in the printer 100 according to the embodiment, the output signal from the optical sensor 71 is used not only for obtaining the rotational frequency of the brushless motor 62 but also for determining the write timing of a scanning line. Therefore, the optical sensor 71 is disposed before a position where the light beam enters the exposure range. However, in a case where a sensor is provided only for obtaining the rotational frequency of the brushless motor 62, this sensor may be disposed after a position where the light beam exits from the exposure range.

In addition, in the printer 100 according to the embodiment, when the FG rotational frequency is not similar to the BD rotational frequency after switching the FG control to the BD control as the rotation control of the brushless motor 62, the rotation control is set to return to the FG control again. However, the rotation control may not return to the FG control. That is, the determination of S151 or S251 is not necessarily executed. However, when the FG rotational frequency is not similar to the BD rotational frequency, it is highly likely that the BD signal cannot be obtained normally. Therefore, it is preferable that the rotation control of the brushless motor 62 be switched from the BD control to the FG control.

In addition, in the embodiment, the lighting control of the LD 63 is stopped after switching the rotation control of the brushless motor 62 to the FG control. However, the lighting control of the LD 63 is not necessarily stopped. However, when the BD signal is not used, for example, immediately after the FG control starts, it is preferable that the lighting of the LD 63 be avoided to suppress unnecessary exposure of the photosensitive member 2.

In addition, in the embodiment, when the next printing job start instruction is given, that is, when the printing job starts, the target rotational frequency of the brushless motor 62 changes. However, the target rotational frequency of the brushless motor 62 may change during the printing job, and this case is also included in the scope of this disclosure.

In addition, in the control according to the first embodiment, the printer 100 switches the control of the rotational frequency of the brushless motor 62 to the BD control in response to satisfying a condition where the BD signal is received N times in S131 after the control of the rotational frequency of the brushless motor 62 is switched to the FG control and then the lighting control of the LD 63 starts again. However, the control of the rotational frequency of the brushless motor 62 may be switched to the BD control without executing the determination of S131. By starting the BD control again after verifying that the BD signal can be reliably received, deterioration in the accuracy of the rotation control of the motor can be further suppressed.

In addition, in the control according to the first embodiment, when the target rotational frequency of the brushless motor 62 decreases, the printer 100 switches the control of the rotational frequency of the brushless motor 62 from the BD control to the FG control. However, a configuration in which the deceleration of the brushless motor 62 waits until the condition of S121 is satisfied without executing the FG control after stopping the BD control may be adopted.

In addition, in the control according to the second embodiment, the printer 100 starts the lighting control of the LD 63 after the FG rotational frequency becomes similar to the target rotational frequency in S213. However, the lighting control of the LD 63 may start after executing the determination of S213. In this case, during a period where the FG rotational frequency is distant from the target rotational frequency, the BD rotational frequency cannot be accurately obtained. Therefore, when laser light is not emitted, deterioration of the photosensitive member 2 can be further suppressed.

In addition, the processes described in the embodiment may be executed by hardware such as a single CPU, multiple CPUs, or ASIC, or a combination of hardware. In addition, the processes described in the embodiment can be realized in various forms such as a recording medium that records a program for executing the processes, or a method.

What is claimed is:

1. An image forming apparatus comprising:
   a photosensitive member;
   a light source configured to emit a light beam;
   a mirror configured to deflect the light beam;
   a motor configured to rotate the mirror;
   an optical sensor, which is positioned on an optical path of the light beam that has deflected by the mirror and outside of an exposure region of the photosensitive member and configured to output a light receiving signal in response to receive the light beam; and
   a controller,
   wherein the controller executes
   lighting control of:
      causing the light source to light;
      causing, after lighting the light source and in response to receiving the light receiving signal, the light source to turn off so as to enter into a non-lighting state during a non-lighting period that is shorter than a deflection period of the mirror at a target rotational frequency of the motor and is longer than an exposure period during which the light beam scans the exposure region of the photosensitive member at the target rotational frequency of the motor, wherein the exposure region comprises an entire region on which an electrostatic latent image is to be formed; and
      causing the light source to light again, after the non-lighting period, so that the light beam is incident on the optical sensor, and
   first control of controlling a rotational frequency of the motor based on the light receiving signal during execution of the lighting control,
   wherein, when the target rotational frequency changes from a first rotational frequency to a second rotational frequency that is lower than the first rotational frequency, the controller executes
   speed change control of:
      stopping execution of the first control; and
      changing a rotational frequency of the motor, and
   non-lighting period change control of changing the non-lighting period in the lighting control from a first non-lighting period corresponding to the first rotational frequency to a second non-lighting period corresponding to the second rotational frequency, and
   wherein the controller starts the first control in response to satisfying a condition where the deflection period of the mirror obtained based on a position signal of a rotor of the motor is longer than the second non-lighting period.

2. The image forming apparatus according to claim 1, wherein, in the speed change control, the controller executes second control of controlling a rotational frequency of the motor based on the position signal of the rotor of the motor.

3. The image forming apparatus according to claim 2, wherein, after starting the first control, the controller switches the first control to the second control in response to satisfying a condition where a rotational frequency of the motor obtained based on the light receiving signal is lower than a constant times of a rotational frequency of the motor obtained based on the position signal, the constant being less than 1.

4. The image forming apparatus according to claim 1, wherein, when the target rotational frequency changes from the first rotational frequency to the second rotational frequency, the controller stops the lighting control and starts the lighting control in response to satisfying a condition where the deflection period of the mirror obtained based on the position signal of the rotor of the motor is longer than the second non-lighting period.

5. The image forming apparatus according to claim 1, wherein the controller starts the first control in response to satisfying a condition where the light receiving signal is received more than predetermined times after starting the lighting control.

6. An image forming apparatus comprising:
   a photosensitive member;
   a light source configured to emit a light beam;
   a mirror configured to deflect the light beam;
   a motor configured to rotate the mirror;
   an optical sensor, which is positioned on an optical path of the light beam that has deflected by the mirror and outside of an exposure region of the photosensitive member and configured to output a light receiving signal in response to receive the light beam; and
   a controller,
   wherein the controller executes:
   lighting control of
      causing the light source to light;
      causing, after lighting the light source and in response to receiving the light receiving signal, the light source to turn off so as to enter into a non-lighting state during a non-lighting period that is shorter than a deflection period of the mirror at a target rotational frequency of the motor and is longer than an exposure period during which the light beam scans the exposure region of the photosensitive member at the target rotational frequency of the motor, wherein the exposure region comprises an entire region on which an electrostatic latent image is to be formed; and causing lighting the light source again after the non-lighting period, so that the light beam is incident on the optical sensor, and first control of controlling a rotational frequency of the motor based on the light receiving signal during execution of the lighting control, wherein, when the target rotational frequency changes from a first rotational frequency to a second rotational frequency, the controller executes second control of:
stopping execution of the first control; and
controlling a rotational frequency of the motor based on a position signal of a rotor of the motor, and non-lighting period change control of changing the non-lighting period in the lighting control from a first non-lighting period corresponding to the first rotational frequency to a second non-lighting period corresponding to the second rotational frequency, and wherein the controller switches the second control to the first control in response to satisfying a condition where a rotational frequency of the motor obtained based on the light receiving signal is higher than a first constant times of a rotational frequency of the motor obtained based on the position signal, the first constant being less than 1.

7. The image forming apparatus according to claim 6, wherein when the motor is rotated at a target rotational frequency from a state where the motor is stopped, the controller executes the second control and starts the lighting control in response to satisfying a condition where a rotational frequency of the motor obtained based on the position signal is higher than a predetermined rotational frequency.

8. The image forming apparatus according to claim 6, wherein the controller switches the first control to the second control in response to satisfying a condition where, after starting the first control, a rotational frequency of the motor obtained based on the light receiving signal is lower than a second constant times of a rotational frequency of the motor obtained based on the position signal, the second constant being less than 1.

9. A method of controlling an image forming apparatus, the image forming apparatus including,
a photosensitive member;
a light source configured to emit a light beam;
a mirror configured to deflect the light beam;
a motor configured to rotate the mirror; and
wherein the method executes lighting control of: causing the light source to light;
causing, after lighting the light source and in response to receiving a light receiving signal that is based on detecting the light beam deflected by the mirror at a position outside of an exposure region of the photosensitive member, the light source to turn off so as to enter into a non-lighting state during a non-lighting period that is shorter than a deflection period of the mirror at a target rotational frequency of the motor and is longer than an exposure period during which the light beam scans the exposure region of the photosensitive member at the target rotational frequency of the motor, wherein the exposure region comprises an entire region on which an electrostatic latent image is to be formed;
and causing the light source to light again, after the non-lighting period, so that the light beam is incident on the optical sensor, and first control of controlling a rotational frequency of the motor based on the light receiving signal, the method, when the target rotational frequency changes from a first rotational frequency to a second rotational frequency, comprising:

stopping execution of the first control and changing a rotational frequency of the motor;

changing the non-lighting period in the lighting control from a first non-lighting period corresponding to the first rotational frequency to a second non-lighting period corresponding to the second rotational frequency; and starting the first control in response to satisfying a condition where the deflection period of the mirror obtained based on a position signal of a rotor of the motor is longer than the second non-lighting period.

10. The method of controlling the image forming apparatus according to claim 9, further comprising
switching the first control to the second control in response to satisfying a condition where, after starting the first control, a rotational frequency of the motor obtained based on the light receiving signal is lower than a second constant times of a rotational frequency of the motor obtained based on the position signal, the second constant being less than 1.

11. The image forming apparatus according to claim 1, wherein, when one printing job in which the target rotational frequency is set to a first rotational frequency and the rotational frequency controlled by the first control is completed, the controller determines whether a next printing job is received,
when it is determined that the next printing job is received, the controller determines that a target rotational frequency of the next printing is a second rotational frequency that is lower than the first rotational frequency of the one printing job,
when it is determined that the target rotational frequency of the next printing is the second rotational frequency that is lower than the first rotational frequency, the controller executes, in order to change the target rotational frequency from the first rotational frequency to the second rotational frequency, the speed change control.

12. The image forming apparatus according to claim 6, wherein, when one printing job in which the target rotational frequency is set to a first rotational frequency and the rotational frequency controlled by the first control is completed, the controller determines whether a next printing job is received,
when it is determined that the next printing job is received, the controller determines that a target rotational frequency of the next printing job is a second rotational frequency that is lower than the first rotational frequency of the one printing job, and
when it is determined that the target rotational frequency of the next printing is the second rotational frequency that is lower than the first rotational frequency, the controller executes, in order to change the target rotational frequency from the first rotational frequency to the second rotational frequency, the speed change control.

* * * * *